United States Patent [19]

Hauk

[11] 4,453,895
[45] Jun. 12, 1984

[54] WINDSCREEN WASHER UNIT

[75] Inventor: Klaus Hauk, Altrip, Fed. Rep. of Germany

[73] Assignee: Deere & Company, Moline, Ill.

[21] Appl. No.: 392,447

[22] Filed: Jun. 28, 1982

[30] Foreign Application Priority Data

Jul. 1, 1981 [EP] European Pat. Off. ........ 81303009.5

[51] Int. Cl.³ .......................... F04B 35/04; B60S 1/46
[52] U.S. Cl. .................................... 417/422; 417/424; 15/250.01; 310/71; 310/89; 222/333
[58] Field of Search ....................... 417/422, 423, 424; 15/250.01, 250.02, 250.04; 310/71, 89; 222/333

[56] References Cited

U.S. PATENT DOCUMENTS

| 2,309,670 | 2/1943 | Ruthman | 310/89 |
| 3,158,293 | 11/1964 | Oishei | 15/250.01 |
| 3,316,847 | 5/1967 | Mandy et al. | 417/360 |

FOREIGN PATENT DOCUMENTS

| 1121198 | 1/1962 | Fed. Rep. of Germany | 310/71 |
| 7536534 | 5/1976 | Fed. Rep. of Germany | 417/424 |
| 2269437 | 11/1975 | France | 222/333 |
| 2462594 | 3/1981 | France | 15/250.01 |
| 2495238 | 6/1982 | France | 15/250.02 |
| 1586227 | 3/1981 | United Kingdom | 310/71 |

Primary Examiner—William L. Freeh
Assistant Examiner—Paul F. Neils

[57] ABSTRACT

An electric pump is housed in a recess in a wall of a water container and the pump inlet tube plugs into a lower portion of the container. A polarized electrical connector plugs onto blade terminals on top of the pump. In order to protect the connector from contamination and corrosion, the connector carries a cover plate attached by aperture lugs of the connector snapped onto pegs on the underside of the plate. A plurality of pairs of pegs in different positions can be provided for use with pumps with variously positioned terminals. When the unit is fitted with the recessed wall against a mounting surface of the vehicle, the enclosure of the pump is completed.

7 Claims, 6 Drawing Figures

WINDSCREEN WASHER UNIT

BACKGROUND OF THE INVENTION

The present invention relates to a windscreen washer unit.

Such units already have wide commercial usage. Typically, the pump is neatly contained within a parallelipidal volume defined by the container, but is actually outside the container so that the electric motor cannot be affected by the water in the container.

Such units are conventionally mounted in a protected position, either inside the engine compartment or behind the dashboard, for example. Such a location is not very convenient, especially in the case of a tractor or earthworking vehicle used in dirty conditions requiring much use of the windscreen washer and therefore, frequent replenishment of the container. The driver has to open up the bonnet or fill the container in an inconvenient, cramped location every time it runs dry.

A further problem is that, although several pump manufacturers have standardized their pumps in many respects, including the use of terminals for a common type of DIN (German Industry Standard) connector, they have not, as yet, standardized the location on top of the pump for the blade terminals. This means that different cover plates could be needed for different pumps which would lead to increased tooling costs and inventory.

SUMMARY OF THE INVENTION

An object of the present invention is to avoid such problems by providing a unit which can be mounted externally on the vehicle, where it can easily be replenished.

Another object is to provide such a unit with an electrical connection which is protected from contamination and corrosion of the contact elements.

Another object of the present invention is to provide such a pump unit with a cover which can accommodate different connectors.

The invention achieves all of its objects with a cover plate and an adaptation of the connector to effect the attachment of the cover plate thereto. The cover plate can be an inexpensive injection molding of a black polyamide plastic material, for example.

DETAILED DESCRIPTION

Figure 1:
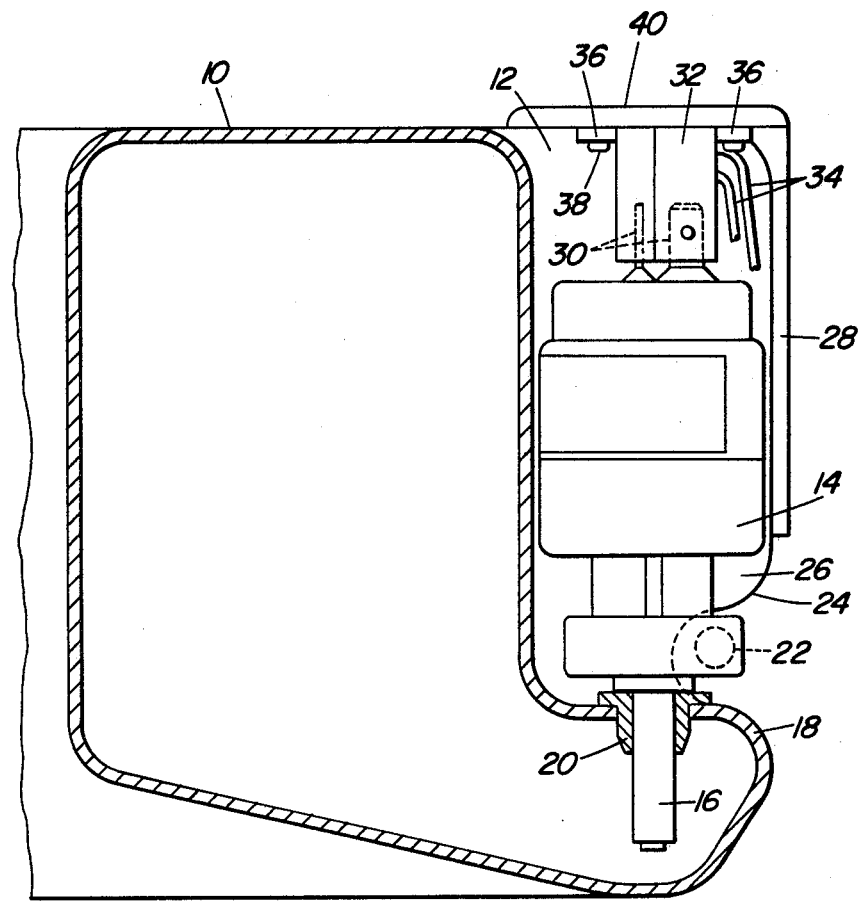
FIG. 1 is a partially sectioned elevation of a washer unit embodying the invention.

Referring to FIG. 1, a windscreen washer unit comprises a water container 10 of tough, molded plastic material formed with a recess 12 in one corner to accommodate an electric pump 14. The pump 14 has an inlet tube 16 plugged into a lower shelf part 18 of the container through a sealing grommet 20. The outlet pipe 22 passes out sideways through a recessed part 24 of an end wall 26, 28 of the container which wraps partially around the pump 14, so that the latter is well protected.

The pump 14 is a commercially available device with two blade terminals 30 at the top set at 90 degrees to each other to receive a polarized connector 32. The wires 34 leading down from the connector are shown only partially to avoid confusing the drawing. The connector 32 has two apertured lugs 36 at the top which snap onto pegs 38, depending from a cover plate 40. As will appear below, the cover plate has more than two pegs 38, but only two are shown in FIG. 1, again, to avoid confusing the drawing. The cover plate 40 is supported in a fixed position relative to the pump 14 through the intermediary of the connector 32. The cover plate 40 covers over the recess 12 and as best seen in FIG. 1, the cover plate 40 is in line with a continuation of the top surface of container 10 so that further protection for the pump is provided, in particular for the electrical connections thereto.

Figure 2:
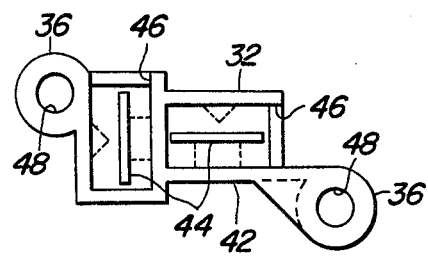
FIG. 2 is a plan view of an electrical connector.
Figure 3:
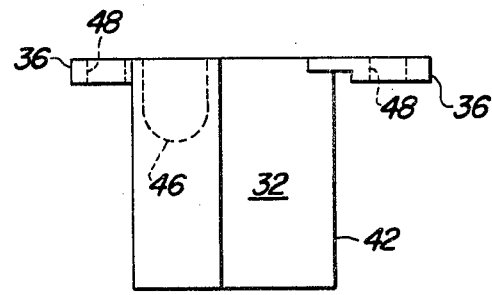
FIG. 3 is an elevation of the connector.

Details of the connector are shown in FIGS. 2 and 3. A molded plastic body 42 houses receptacles 44 for the blade terminals 30 and notches 46 are provided for leading out the wires 34 by way of which the pump 14 is energized. At diagonally opposite corners at the top of the plug are the integrally molded lugs 36 with holes 48 for receiving the pegs 38 of the cover plate 40.

Figure 4:
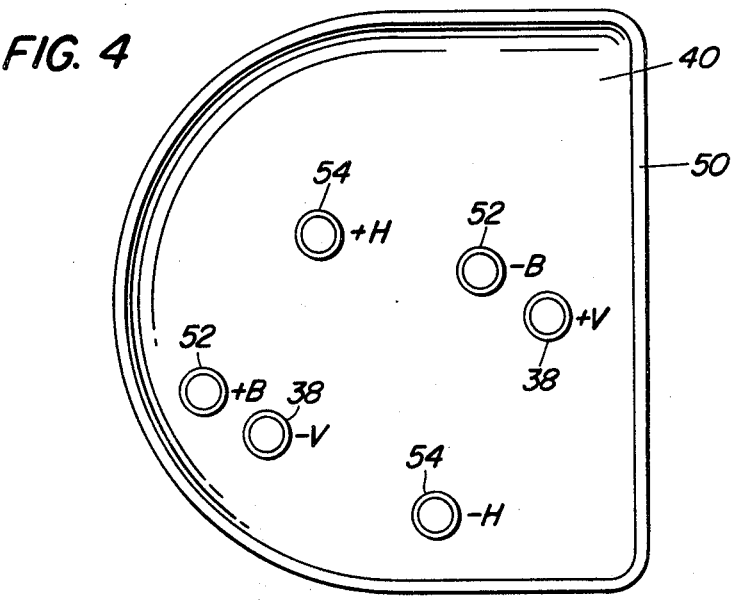
FIG. 4 is a plan view of the underside of a cover plate.

The underside of the cover plate 40 is shown in FIG. 4 and the plate is again of molded plastic material (resistant to fuel, oil, weathering and aging). The plate is shaped to cover the recess 12 (FIG. 1) and has a downturned rim 50 to cooperate snugly with the top of the container 10. There is an array of six pegs depending from the underside of the plate, namely the pegs 38 of FIG. 1, plus two further pairs of pegs 52 and 54.

Figure 5:
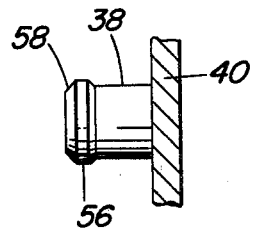
FIG. 5 shows a detail of the cover plate.

A representative peg 38 is shown in detail in FIG. 5 and has an enlarged head 56 with a chamfer 58 so that a lug 36 can be snapped onto the peg and is then retained securely by the head (although it can be pried off if this is ever needed).

The pegs of each pair 38, 52, and 54 are spaced in correspondence with the spacing of the connector lug holes 48 (FIG. 2), but are differently positioned for different positions of the blade terminals 30 relative to the open top of the recess 12 to be covered over by the plate 40. Three different possibilities are allowed for in this specific embodiment. For each application, depending on the container and pump model selected, the appropriate pair of pegs is used. To assist in designating the pair to be used, the pegs are coded by adjacent embossed letters V, B and H for the pairs 38, 52, and 54, respectively, and signs − and + further denote which peg is adjacent the negative and which is adjacent the positive receptacle of the connector 32.

The pegs may have a diameter of 2.5 mm with heads 3.3 mm in diameter while the holes 48 have a diameter of 3 mm, with a tolerance of −0 mm, to +0.2 mm. To further assist in snapping the lugs 36 onto the pegs, the mouths of the holes 48 are slightly flared.

Figure 6:
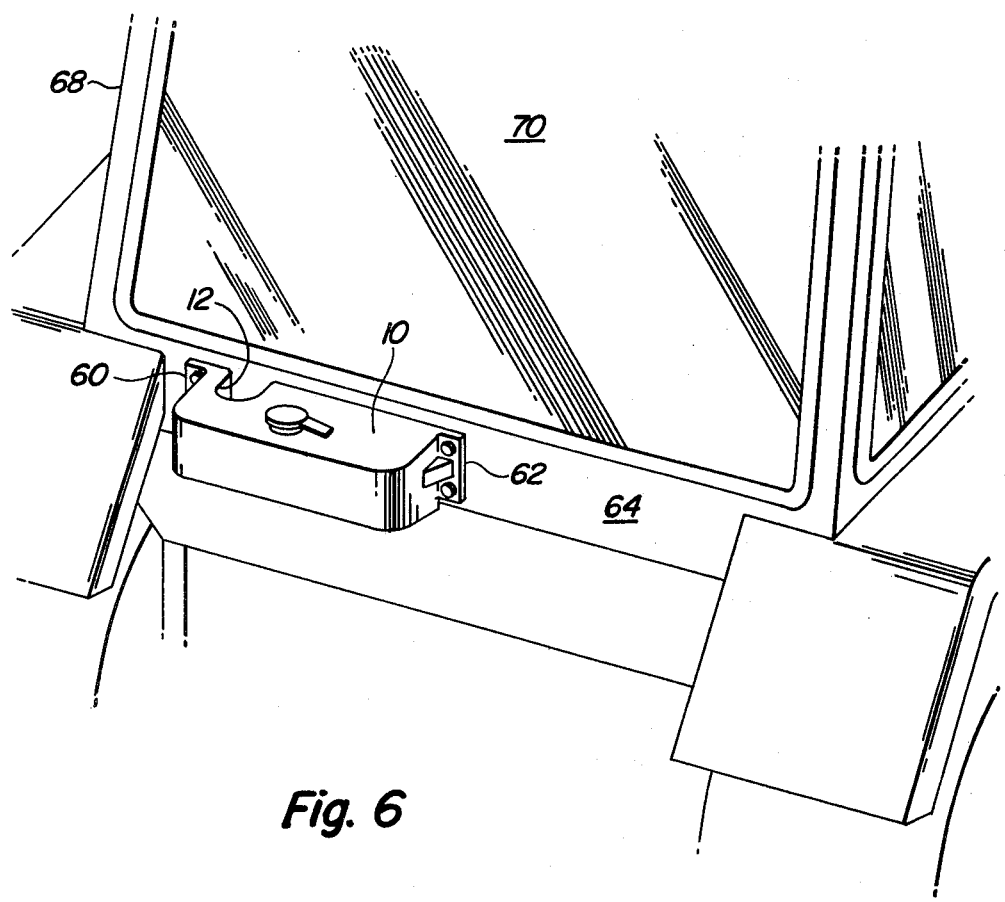
FIG. 6 shows the washer unit fixed to an external surface of a tractor.

The container 10 is elongated in the direction normal to the plane of the drawing in FIG. 1 and, as best seen in FIG. 6, has two integral flanges 60, 62 at the two ends of that face which is recessed to accommodate the pump, i.e. the right-hand face in FIG. 1. These flanges are used to fix the container against a mounting surface 64 of the vehicle, e.g. by bolts through the flanges and this mounting surface completes the enclosure and protection of the pump and the electrical connections. Therefore, the unit can be mounted externally and in one practical application, the mounting surface is the outside of a rear cross beam of a tractor cab 68 below a rear window 70 which the unit serves.

While the invention has been described in conjunction with a specific embodiment, it is to be understood that many alternatives, modifications, and variations will be apparent to those skilled in the art in light of the aforegoing description. Accordingly, this invention is inteneded to embrace all such alternatives, modifications and variations which fall within the spirit and scope of the appended claims.

I claim:

1. In a windscreen washer unit having a water container with a recessed sidewall accommodating an electric pump having an inlet tube plugged into a lower part of the container and an electrical connector in plug-in engagement with terminals on top of the electric pump, a protective plate comprising:

a cover plate carried on top of the electrical connector and cooperating with the recessed sidewall to protect the pump, the cover plate having at least one snap coupling part complementary to a snap coupling part on the electrical connector, whereby the snap coupling can be made between the connector and plate to fix the plate in a position substantially in line with a top surface of the container.

2. The unit, according to claim 1, wherein the container includes fixing means on the container positioned for fixing the container with the recessed sidewall against a vehicle mounting surface, thereby to complete the enclosure of the pump.

3. The unit, according to claim 1, wherein the cover plate is mountable in a plurality of different positions on the connector by virtue of an array of snap coupling parts on an underside of the cover plate, at least one such part for each position.

4. The unit, according to claim 3, wherein each snap coupling part on the cover plate comprises a peg with an enlarged head while the complementary part is an apertured lug on the connector which snaps onto the peg.

5. The unit, according to claim 4, wherein there are two spaced pegs for each cover plate position while the connector has two correspondingly spaced apertured lugs.

6. A windscreen washer unit, comprising:

a water container with a recessed sidewall accommodating an electric pump having an inlet tube plugged into a lower part of the container and an electrical connector in plug-in engagement with terminals on top of the electric pump, a protective cover plate carried on top of the electrical connector and cooperating with the recessed sidewall to protect the pump, the cover plate having at least one snap coupling part complementary to a snap coupling part on the electrical connector, whereby the snap coupling can be made between the connector and plate to fix the plate in position; and fixing means on the container positioned for fixing the container with the recessed sidewall against a vehicle mounting surface, thereby to complete the enclosure of the pump.

7. In a windscreen washer unit having a water container with a recessed sidewall accommodating an electric pump having an inlet tube plugged into a lower part of the container and an electrical connector in plug-in engagement with terminals on top of the electric pump, a protective plate comprising:

a cover plate carried on top of the electrical connector and cooperating with the recessed sidewall to protect the pump, the cover plate having at least one snap coupling part complementary to a snap coupling part on the electrical connector, whereby the snap coupling can be made between the connector and plate to fix the plate in position, the cover plate being mountable in a plurality of different positions on the connector by virtue of an array of snap coupling parts on an underside of the cover plate, at least one such part for each position, each snap coupling part on the cover plate comprising a peg with an enlarged head while the complementary part is an apertured lug on the connector which snaps onto the peg, there being two spaced pegs for each cover plate position while the connector has two correspondingly spaced apertured lugs.

* * * * *